(12) United States Patent
Bresson et al.

(10) Patent No.: US 12,712,388 B2
(45) Date of Patent: Aug. 18, 2026

(54) INDUCTIVELY CHARGED DOOR OPERATOR SYSTEM ACCESSORIES

(71) Applicant: ASSA ABLOY Entrance Systems AB, Landskrona (SE)

(72) Inventors: David P. Bresson, Pfafftown, NC (US); Neil Edwards, Kernersville, NC (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 0 days.

(21) Appl. No.: 18/966,833

(22) Filed: Dec. 3, 2024

(65) Prior Publication Data

US 2026/0155679 A1 Jun. 4, 2026

(51) Int. Cl.

*H02J 50/10* (2016.01)
*E05F 15/668* (2015.01)
*H02J 7/00* (2026.01)
*H02J 7/50* (2026.01)
*H02J 50/40* (2016.01)

(52) U.S. Cl.

CPC ............ *H02J 50/10* (2016.02); *E05F 15/668* (2015.01); *H02J 7/50* (2026.01); *H02J 7/855* (2026.01); *H02J 50/40* (2016.02); *E05Y 2201/688* (2013.01); *E05Y 2400/35* (2013.01); *E05Y 2400/614* (2013.01); *E05Y 2900/106* (2013.01); *E05Y 2900/132* (2013.01)

(58) Field of Classification Search

None

See application file for complete search history.

(56) References Cited

U.S. PATENT DOCUMENTS

2010/0128122 A1* 5/2010 Wright ................... H04N 23/55 348/E5.022
2011/0221385 A1* 9/2011 Partovi ................... H02J 50/40 320/108
2022/0216732 A1* 7/2022 Abrahamsson ....... E05D 15/242
2022/0358801 A1* 11/2022 Archbold ........... G07C 9/00309
2024/0190277 A1* 6/2024 Smith ................ H05K 7/20145

FOREIGN PATENT DOCUMENTS

WO 2016022534 A2 2/2016
WO 2020234034 A1 11/2020
WO 2021156338 A1 8/2021

OTHER PUBLICATIONS

Search Report and Written Opinion from corresponding International Application PCT/EP2025/084875, mailed Mar. 10, 2025.

* cited by examiner

*Primary Examiner* — Menatoallah Youssef
*Assistant Examiner* — Aqeel H Bukhari
(74) *Attorney, Agent, or Firm* — Burr & Forman

(57) ABSTRACT

A door operator system may include a sectional door, an opener operably coupled to the sectional door to move the sectional door via a roller assembly operably coupling the sectional door to a rail assembly to enable the sectional door to transition between an open state and a closed state via the roller assembly carrying the sectional door in the rail assembly, and a plurality of accessories associated with the sectional door or components of the sectional door. The accessories may include at least one powered device having a rechargeable battery that is charged based on inductive charging via an inductive charging assembly.

18 Claims, 7 Drawing Sheets

INDUCTIVELY CHARGED DOOR OPERATOR SYSTEM ACCESSORIES

TECHNICAL FIELD

Example embodiments generally relate to accessories of movable doors, such as garage doors, industrial doors, and the like, and in particular, relate to a system where accessories of the system can be powered via inductive charging.

BACKGROUND

Moveable sectional doors, such as garage doors, industrial doors and the like, have been around for a very long time, and have been adapting into more complicated and capable systems. In this regard, for example, connectivity of various devices has further enabled many functional capabilities for garage door opener (GDO) and other door operator systems that improve the operation of the systems and the satisfaction of users. The additional devices that have been connected to the door operator systems to improve performance include various sensors, lights, displays, locks, remote controls, cameras, etc. These additional devices are typically referred to as accessories, and have become very much in demand for modern door operator systems.

Whereas the functions enabled by these accessories are both popular and in demand, the motivation to include them often drives people to be willing to endure complicated setup, or engage in extra efforts to keep such accessories powered. In this regard, for example, when not powered by wired connection, the accessories may draw power from batteries that are either replaceable or rechargeable. The user may therefore be required to replace the batteries or collect them for separate recharging. Unless the user employs a program of routine maintenance, which certainly adds to the user's workload, the system may be degraded in function when the batteries are exhausted and the corresponding accessories cease to function to thereby inform the user of the need for replacement or recharging.

Accordingly, it may be desirable to define a system that does not suffer from the limitations described above. In this regard, for example, it may be preferable to develop a system in which the accessories can continue to function without any need for the user to take an active role in recharging or replacing batteries.

BRIEF SUMMARY OF SOME EXAMPLES

In an example embodiment, a door operator system may be provided. The door operator system may include a sectional door, an opener operably coupled to the sectional door to move the sectional door via a roller assembly operably coupling the sectional door to a rail assembly to enable the sectional door to transition between an open state and a closed state via the roller assembly carrying the sectional door in the rail assembly, and a plurality of accessories associated with the sectional door or components of the sectional door. The accessories may include at least one powered device having a rechargeable battery that is charged based on inductive charging via an inductive charging assembly.

In another example embodiment, an inductive charging assembly for providing power to an on-door accessory for a door operator system that includes a sectional door and an opener operably coupled to the sectional door to move the sectional door may be provided. The inductive charging assembly may include a primary charge coil disposed proximate to a portion of the sectional door, a secondary charge coil disposed on a portion of the section door adjacent to the primary charge coil in either an open or closed state of the sectional door, an alternating current to direct current (AC-DC) converter to convert AC output from the secondary charge coil to DC, and a rechargeable battery that is charged via the DC converted at the AC-DC converter to power the on-door accessory.

In yet another example embodiment, an on-door power distribution network for powering accessories of a door operator system without wires extending on-door from off-door may be provided. The door operator system may include a sectional door and an opener operably coupled to the sectional door to move the sectional door. The on-door power distribution network may include a secondary charge coil disposed at a portion of the sectional door that is proximate to a primary charge coil disposed adjacent to the sectional door when the sectional door is in a closed position, an alternating current to direct current (AC-DC) converter to convert AC output from the secondary charge coil to DC, a plurality of accessories associated with the sectional door or components of the sectional door, and a rechargeable battery that is charged via the DC converted at the AC-DC converter, the rechargeable battery being associated with one or more of the accessories.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
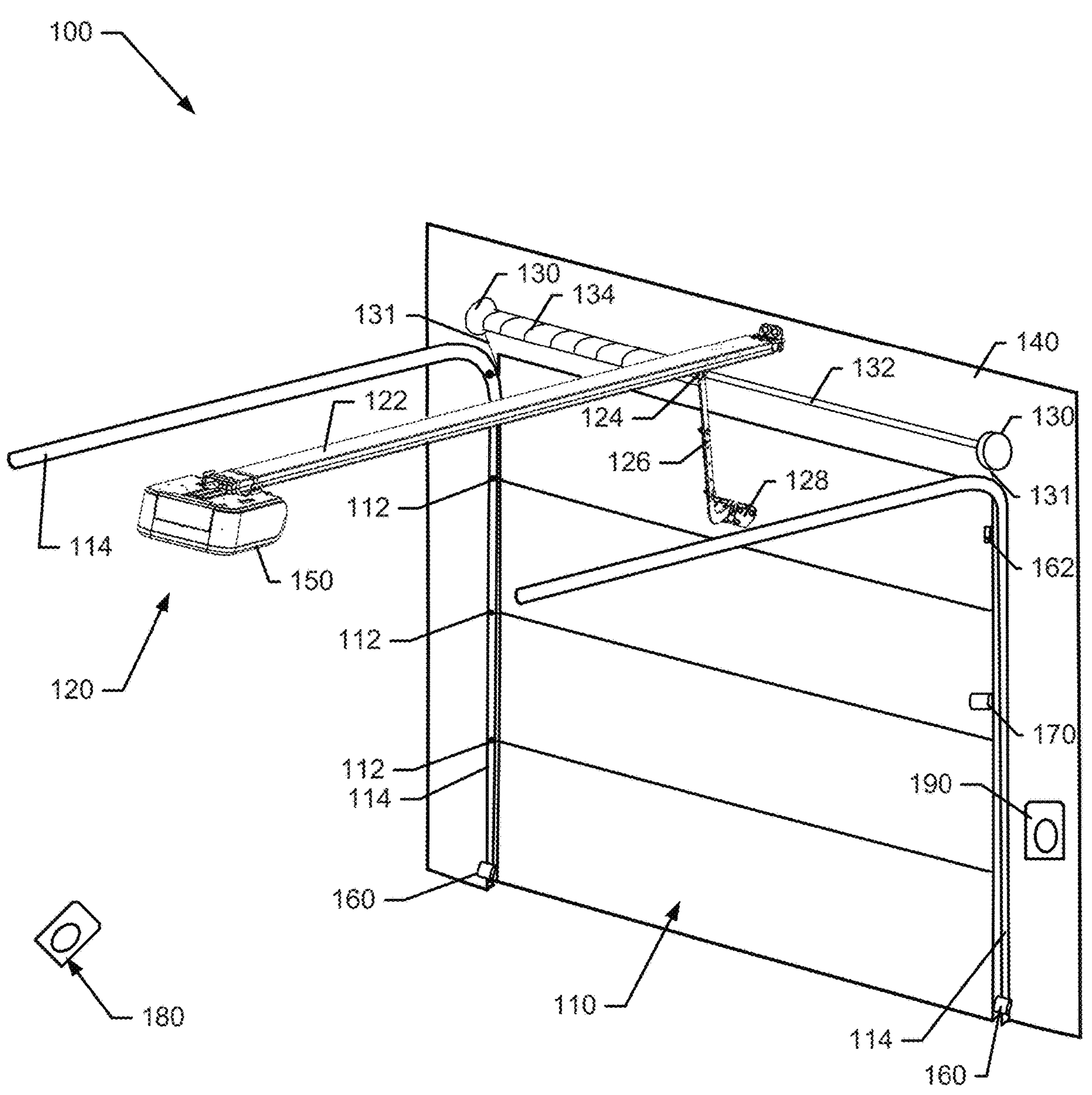
FIG. 1 illustrates a perspective view of a GDO system in a ceiling mounted or trolley in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, example embodiments are aimed at eliminating a need for the user to engage in continued maintenance operations in order to keep accessories powered when the accessories are not connected to the system via wired connections. To accomplish this, example embodiments may employ inductive charging for the batteries of the accessories. Particularly for accessories that are on the sectional door itself (e.g., "on-door" or movable accessories), it would be preferable to avoid any connection of wires from off the door to any battery or accessory that is on-door. By using inductive charging to cross the boundary between stationary and moving environments, this problem can be overcome, and example embodiments employ inductive charging for this purpose.

FIG. 1 illustrates a garage door opener (GDO) system 100 of an example embodiment. In this regard, FIG. 1 shows the GDO system 100 in a trolley (or ceiling mounted) configuration, but it should be understood that example embodiments may also apply to situations in which the GDO system 100 is in a jackshaft configuration. In both cases, the GDO system 100 includes a sectional door 110, in which each section of the door has rollers 112 operably coupled to opposing lateral sides of the sections. The rollers 112 are typically rotatably operably coupled to the sectional door 110 via brackets that rotatably support a shaft of the rollers 112 and enable a wheel to extend into and ride within rails 114 disposed on opposing sides of the sectional door 110 as the sectional door 110 transitions between open and closed positions. The sectional door 110 of FIG. 1 is shown in the closed position, where the rollers 112 are in a vertical section of the rails 114. Thus, it can be appreciated that in the open position the rollers 112 are located in a horizontally extending portion of the rails 114, and the sectional door 110 is carried into parallel with the ground as opposed to its condition of being perpendicular to the ground in the closed position shown in FIG. 1. Each section of the sectional door 110 can pivot relative to any adjacent section at an intersection thereof in order to enable the sectional door 110 to traverse the bend that separates the horizontally extending portion of the rails 114 from the vertically extending portion of the rails 114.

FIG. 1 also illustrates a GDO unit referred to as an opener 120 or motorhead. The opener 120 of this example is shown in the trolley configuration in which a guide rail 122 may extend parallel to and approximately midway between the horizontally extending portion of the rails 114 on opposing lateral sides of the sectional door 110. The opener 120 may be mounted (e.g., from the ceiling) proximate to an end of the guide rail 122 to drive a trolley 124 along the guide rail 122 via a flexible member such as a belt, cable or chain. The belt, cable or chain may also be operably coupled (e.g., via the trolley 124) to a top portion of the sectional door 110 by an engaging arm 126 and engaging bracket 128 that is attached to the sectional door 110. As noted above, the trolley 124 may be manually released from the sectional door 110 to allow for manual repositioning of the sectional door 110.

In some cases, the sectional door 110 may also be supported by one or more instances of cables 131 that are alternately wound onto and off of one or more cable drums 130 disposed at or near opposing ends of a tube 132 (sometimes called a drive tube). The cables 131 may be attached to a bottom portion of the sectional door 110 to assist in carrying the weight of the sectional door 110. The tube 132 may further support a spring assembly 134 that facilitates, along with the cables 131, supporting the weight of the sectional door 110 during opening and closing operations of the sectional door 110 using the opener 120. The sectional door 110, when closed, may block an opening provided in a front wall 140 of the garage in which the GDO system 100 is installed. The opening may be left open when the sectional door 110 is raised onto the horizontally extending portions of the rails 114. As can be seen in FIG. 1, the guide rail 122 may be secured to the front wall 140 at a proximal end of the guide rail 122, and the opener 120 may be suspended from the ceiling of the garage at a distal end of the guide rail 122.

The sectional door 110 is, as noted above, often comprised of panels of aluminum, steel, fiberglass, plastic, or other relatively lightweight, but otherwise structurally rigid material of any suitable type. In some cases, one or more of the panels of the sectional door 110 may include or be comprised of a glass or film that may be transparent or translucent to allow natural light to pass therethrough and into the garage. Moreover, it should be understood that the GDO system 100 of FIG. 1 is merely an example of a door operator system in which example embodiments may be practiced. Industrial doors and other movable doors may also employ example embodiments.

The GDO system 100 of FIG. 1, and any other door operator system, may further include a number of accessories, as noted above. The accessories may include, for example, a light 150. The light 150 of this example happens to be located at the opener 120. However, the light 150 may alternatively be located at another portion of the garage and, in some cases, may be removable from its location at and connection with the opener 120, and may be positionable at another location in the garage. Particularly when located remotely from the opener, the advantage of having the light 150 be powered by a battery may become more apparent. Nevertheless, regardless of where the light 150 is located, battery power, and the advantages described herein relative to charging the battery may be employed. The light 150 may be for illumination or for indicating various states or conditions of the GDO system 100. Moreover, the light 150 may be or include a light emitting diode (LED) or an incandescent light, among other potential illumination or indication options. Other powered accessories may include privacy glass, an LED or other display screen, and/or the like.

Other accessories that may be included in the GDO system 100 may include various sensors such as, for example, an obstacle sensor 160 that detects when an obstacle is located in the opening, which my interfere with the ability to close the sectional door 110. Another sensor that may be included in the GDO system 100 may include a door position sensor 162, which may detect the position of the sectional door 110 (e.g., open/closed, or defining a percentage of open/closed). Other sensors may also be included such as, for example, speed sensors, temperature sensors (e.g., thermometers), force sensors, motion sensors, visual sensors (e.g., a camera), carbon monoxide sensor, and/or the like.

The GDO system 100 may also include a lock 170, which may be located on or next to the sectional door 110 and in some cases proximate to the rails 114 in order to, when actuated or activated, prevent the roller 112 from transiting in the rails 114 or otherwise inhibit or prevent movement of the sectional door 110. In some cases, the lock 170 may include a pin that extends into a lock receiver that may be located on the sectional door 110, one or both of the rails 114, the front wall 140, or any other surface or component such that when the pin is extended into the lock receiver, the sectional door 110 is effectively fixed in its location and unable to move relative to the rails 114.

Other accessories of the GDO system 100 may include one or more instances of a controller, which may include a movable (remote) controller 180 and a fixed controller 190, which may be mounted on a wall or at the opener 120. Notably, although the fixed controller 190 of FIG. 1 is located at the front wall, the fixed controller 190 may alternatively be located at a back wall or any sidewall of the garage (or other location in which the operator system is employed). The movable controller 180 may be located in a vehicle, or may be carried by the user, or otherwise be movable and usable when within range of the opener 120 to wirelessly instruct the opener 120 to operate to open or close the sectional door 110. The fixed controller 190 and/or the movable controller 180 may include a simple button or other actuator to operate the opener 120. However, in other examples, the fixed controller 190 and/or movable controller 180 may include a display (e.g., touch screen display) or other more complicated user interface to enable control of the opener 120 in addition to other functions associated with operation, monitoring or control of the GDO system 100.

Figure 2:
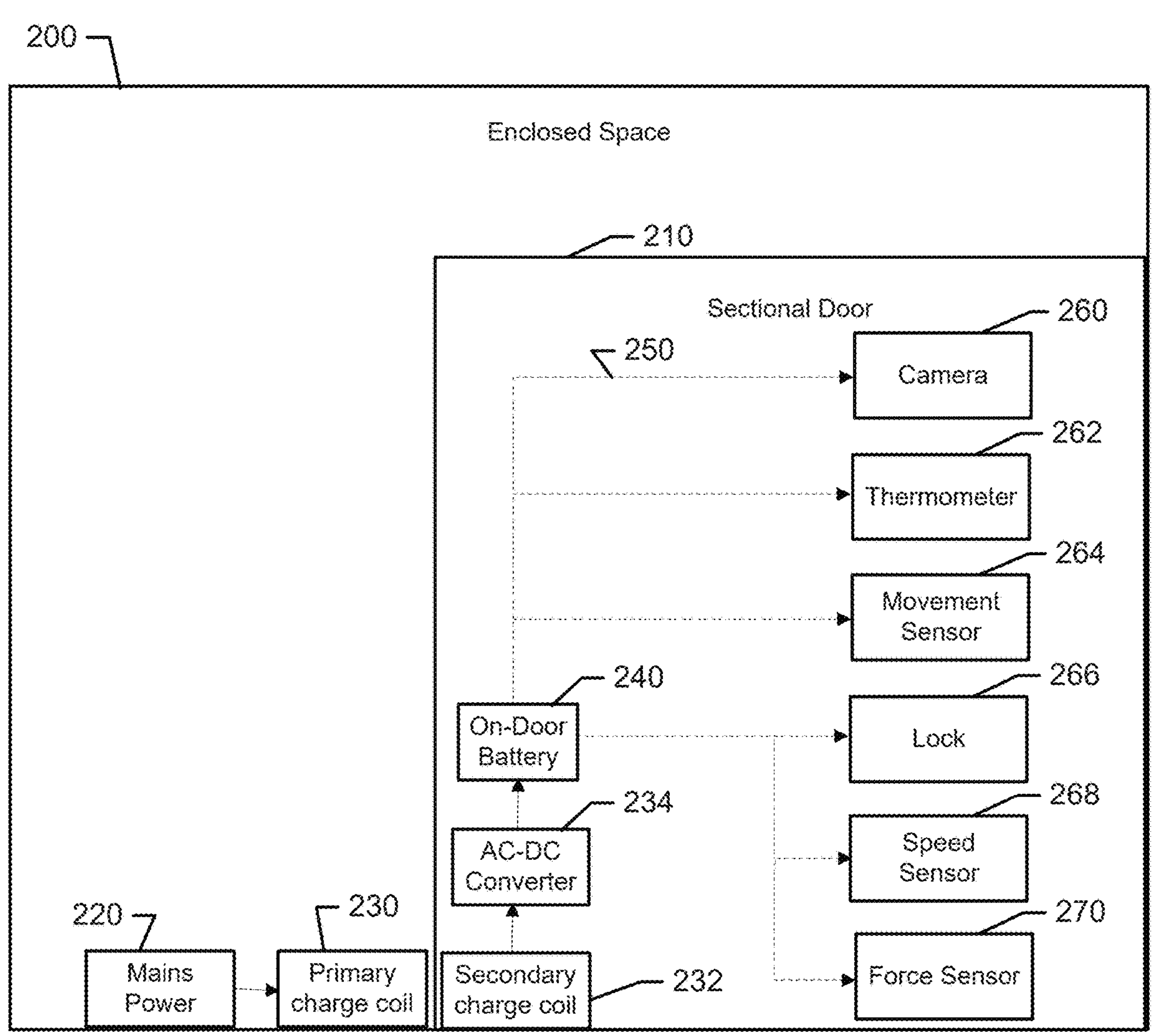
FIG. 2 illustrates a block diagram of an accessory charging system that uses inductive charging in accordance with an example embodiment.

As noted above, to the extent any of the accessories of the GDO system 100 are powered with a local battery, it may be desirable to avoid continued manual efforts to recharge or replace the battery. To accomplish this example embodiments may employ inductive charging that may charge local batteries free of any need for manual interaction by the users. FIG. 2 illustrates one particular structure via which inductive charging may be exploited in this context.

Turning to FIG. 2, access to an enclosed space 200 is at least partly controlled via a sectional door 210 (e.g., an example of the sectional door 110 of FIG. 1). The sectional door 210 is also merely an example of a door, or any other movable barrier (e.g., a gate, etc.) to access to the enclosed space 200. The enclosed space 200 may be a garage, an industrial or commercial facility (e.g., a storage facility, loading dock, a restaurant, bar, or any of many other possibilities). The house or facility at which the enclosed space 200 is located may include conventional alternating current (AC) power in the form, for example, of mains power 220 that may be provided from the power grid of the local area. The mains power 220 may be wired to the house or facility and may in turn include a plurality of wired connections to individual components and outlets or receptacles at the house or facility. Regardless of the specific architecture employed, the mains power 220 may in turn be provided to a primary charge coil 230, which may include a primary induction coil through which AC passes to create a magnetic field of fluctuating strength based on the AC input provided thereat.

The primary charge coil 230 may be operably coupled to a secondary charge coil 232 located at a portion of the sectional door 210. The secondary charge coil 232 may include a secondary induction coil that experiences the fluctuating strength of the magnetic field generated at the primary induction coil as an input and generates an AC output proportional to the strength of the changing input. The secondary charge coil 232 therefore outputs an AC signal that can be provided to an AC to direct current (DC) converter 234, which may include a rectifier and convert the AC from the secondary charge coil 232 into a DC output. The DC output may then be provided to charge an on-door battery 240.

In some cases, the sectional door 210 may include a single instance of the on-door battery 240, and the on-door battery 240 may be a rechargeable battery that discharges to power one or more on-door sensors that are operably coupled to or mounted on the sectional door 210. Meanwhile, the on-door battery 240 is recharged via the transfer of power through inductive coupling provided by the primary charge coil 230 and the secondary charge coil 232.

Given that the sectional door 210 is known to move between an open position in which a bottom of the sectional door 210 is lifted off the ground and carried onto the horizontal portion of the rails 114 of FIG. 1 (or otherwise spaced relatively far apart from the ground to permit access to the enclosed space 200) and a closed position in which the bottom of the sectional door 210 generally touches or at least is close to contacting the ground, it can be appreciated that strategically locating the primary charge coil 230 and the secondary charge coil 232 is important. In this regard, the efficiency of power transfer between the primary charge coil 230 and the secondary charge coil 232 is desirably kept as high as possible. Meanwhile, the efficiency is impacted by various factors, which can include the distance between the primary charge coil 230 and the secondary charge coil 232, alignment of the primary charge coil 230 and the secondary charge coil 232, frequencies employed, and the like. Thus, the primary charge coil 230 and the secondary charge coil 232 should be positioned such that they are able to have a reliable good alignment and a relatively small distance therebetween. In most cases, the sectional door 210 can be expected to spend most of its time, or at least long stretches of time (e.g., overnight), in the closed position. Thus, the primary charge coil 230 and the secondary charge coil 232 may be positioned to be aligned with each other in the closed position of the sectional door 210. Accordingly, for example, the primary charge coil 230 and the secondary charge coil 232 may be positioned close to the ground or floor of the enclosed space 200. Although alignment at the open position is also possible, and therefore the primary charge coil 230 and the secondary charge coil 232 could be positioned to be aligned in the open position for any door that spends most of its time in the open position, it is generally not advisable to attempt any alignment at any intermediate position between the open and closed positions unless some unusual circumstance would dictate such a decision.

In some embodiments, the on-door battery 240 may be operably coupled to on-door accessories via an on-door power distribution network 250. The on-door power distribution network 250 may include wired connections that extend through portions of the sectional door 210, but do not extend off the sectional door 210. Some example structures for embodying the on-door power distribution network 250 will be discussed in greater detail below. The on-door power distribution network 250 may operably couple the on-door battery 240 to on-door accessories including, for example, a camera 260, a thermometer 262, a movement sensor 264 (or motion sensor), a lock 266, a speed sensor 268 and a force sensor 270. However, other on-door accessories may be included in some cases, and FIG. 2 is not intended to provide an exhaustive list of such accessories.

Figure 3:
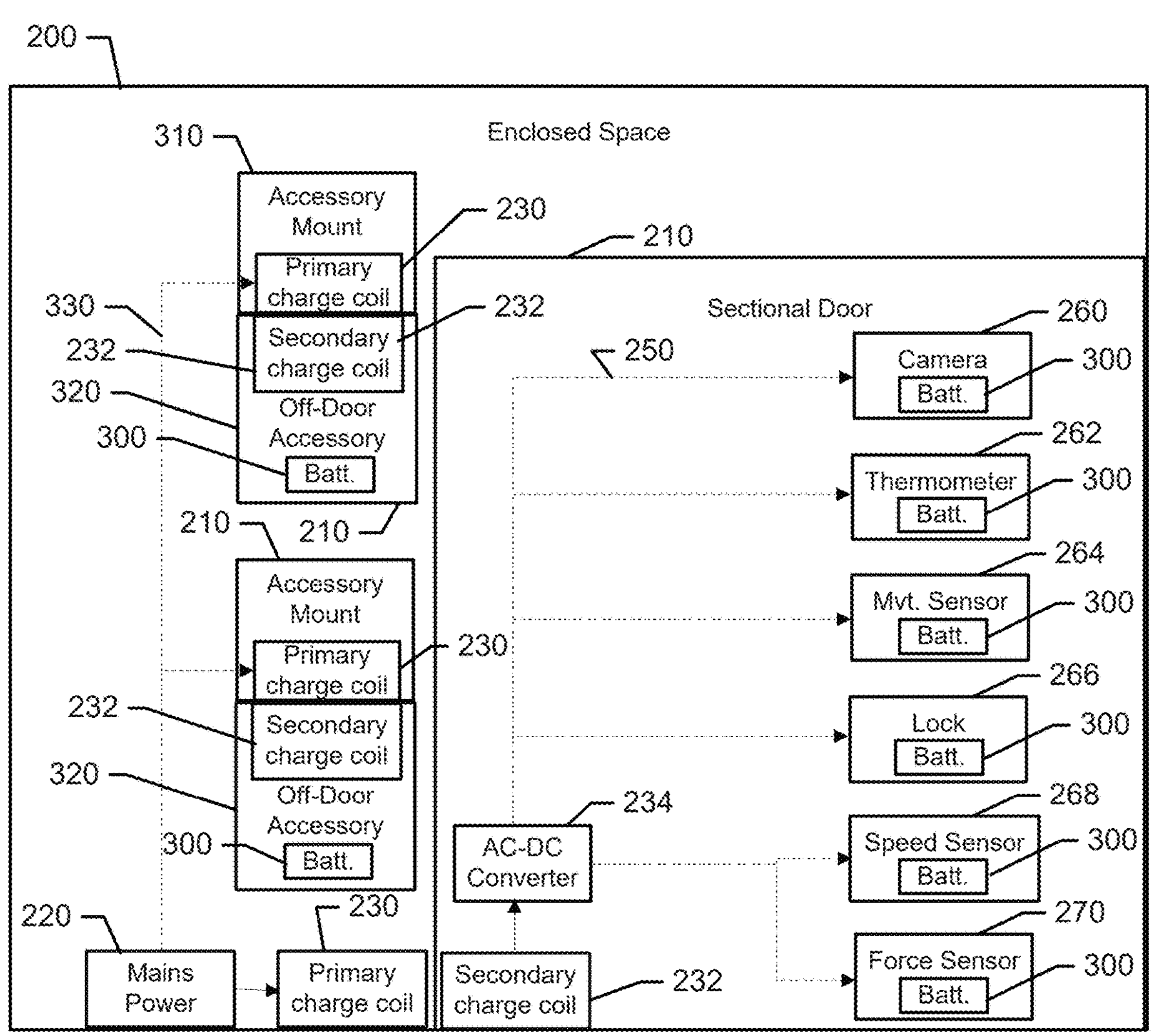
FIG. 3 illustrates a block diagram of an accessory charging system that has both on-door and off-door power distribution networks in accordance with an example embodiment.

As can be appreciated from FIG. 2, the on-door accessories may be robustly provided on the sectional door 210 by virtue of providing a wire-free, yet robust capability for getting power onto the sectional door 210. The on-door accessories may then be leveraged to include the capabilities and utility of the GDO system 100 generally, or any other system into which the components shown may be integrated. However, it should further be appreciated that the specific architecture shown is not the only way to provide these benefits, and modifications may be made while still providing the same benefits. For example, instead of powering a single instance of the on-door battery 240, multiple instances may be provided. In this regard, the on-door battery 240 may be a collection of individual cells or batteries that may be distributed to different sections or panels of the sectional door 210, or to individual components (or accessories). Moreover, inductive charging may be used for other accessories that are not necessarily on-door. FIG. 3 shows some examples.

Turning now to FIG. 3, each of the on-door accessories shown in FIG. 2 may be powered individually by their own respective instance of an accessory battery 300. The accessory batteries 300 may be rechargeable directly from the AC-DC converter 234. However, in some cases, a hybrid system may be provided where an instance of the on-door battery 240 of FIG. 2 may be included to power some of the on-door accessories or to charge the accessory batteries 300 of at least some of the on-door accessories via the on-door power distribution network 250.

Furthermore, in some cases, the use of inductive charging may be employed in an off-door context as well. For example, as shown in FIG. 3, mains power 220 may be provided to one or more instances of an accessory mount 310, which may be disposed anywhere in or proximate to the enclosed space 200. Each instance of the accessory mount 310 may include its own respective instance of the primary charge coil 230, and may be shaped or otherwise structured to receive and retain or mount an off-door accessory 320. The off-door accessory 320 may include its own respective instance of the secondary charge coil 232, the AC-DC converter 234 (not shown in FIG. 3 due to space limitations), and the accessory battery 300. A wired network from the mains power 220 to each instance of the accessory mount 310 may be formed as an off-door power distribution network 330.

In some cases, the accessory mount 310 may be unique to the accessory for which it serves as a mounting apparatus. However, in some example embodiments, the accessory mount 310 may be a standard mounting interface that may fit any of a number of different types of off-door accessories 320. Thus, for example, the off-door accessories 320 (e.g., lights, controllers, cameras, sensors, etc.) may be installed in a plug-and-play fashion into each of the instances of the accessory mount 310. Wiring may therefore be established in connection with initial setup of the off-door power distribution network 330, but thereafter, the configuration of wiring may not need any adjustment whereas any collection or combination of different off-door accessories 320 may be deployed in the various instances of accessory mounts 310 disposed in or throughout the enclosed space.

The on-door accessories may have similar commonly structured mounts thereon. Thus, for example, a collection of on-door accessories may similarly be deployed and thereafter changed with simple plug-and-play insertion of new accessories into the existing mounts provided on the sectional door 210. The primary charge coil 230, the secondary charge coil 232, the AC-DC converter 234, and the accessory battery 300 of each device may therefore be standardized in relation to their respective interfaces so that maximum flexibility is provided to the user with respect to the acquisition and deployment of new accessories for the sectional door 210, or more specifically for the environment in and around the enclosed space 200.

Figure 4:
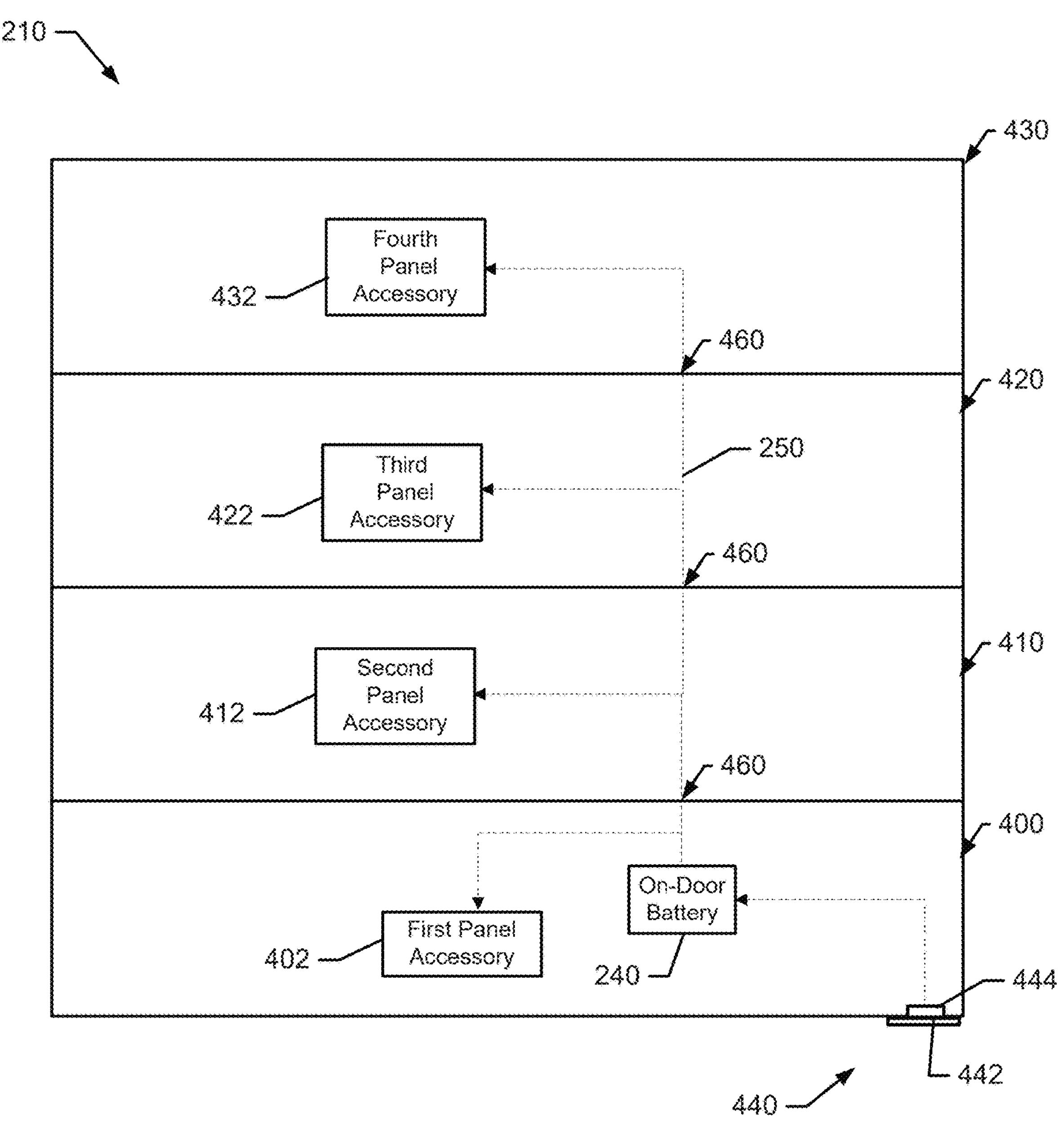
FIG. 4 is a block diagram of an inductive charging system where one pair of primary and secondary charge coils power all on-door accessories according to an example embodiment.

Turning more specifically to the structures associated with defining the on-door power distribution network 250 of an example embodiment, FIG. 4 illustrates the use of a single instance of an inductive charging apparatus for providing power to all panels of the sectional door 210. In this regard, the sectional door 210 of FIG. 4 includes a first door panel 400 having a first panel accessory 402, a second door panel 410 having a second panel accessory 412, a third door panel 420 having a third panel accessory 422, and a fourth door panel 430 having a fourth panel accessory 432. The first, second, third and fourth panel accessories 402, 412, 422 and 432 are examples of on-door accessories. One of skill in the art will appreciate that either more or fewer door panels may be included in example embodiments, and will also appreciate that additional panel accessories may be included on each respective one of the door panels included in any case.

In the example of FIG. 4, a single instance of the on-door battery 240 may provide power to all of the on-door accessories. Moreover, such power may be provided by a single instance of a floor mounted inductive charging assembly 440. The floor mounted inductive charging assembly 440 includes a primary charge pad 442 (e.g., including an example of the primary charge coil 230 of FIGS. 2 and 3) that is provided on the ground or floor beneath the sectional door 210. Meanwhile, the floor mounted inductive charging assembly 440 may also include a secondary charge pad 444, which may be provided on a bottom portion of the bottom panel (e.g., the first door panel 400 in this example) of the sectional door 210. The secondary charge pad 444 may include an instance of the secondary charge coil 232 of FIGS. 2 and 3 along with an instance of the AC-DC converter 234.

Although the on-door battery 240 is provided on the first door panel 400 in FIG. 4, the on-door battery 240 may alternatively be provided on any other one of the second, third or fourth door panels 410, 420 or 430. Moreover, the architectures of either FIG. 2 or FIG. 3 may be employed with respect to powering the first, second, third and fourth panel accessories 402, 412, 422 and 432. In this regard, the on-door battery 240 may directly power the first, second, third and fourth panel accessories 402, 412, 422 and 432 in the manner shown in FIG. 2, or the on-door battery 240 may be omitted and the floor mounted inductive charging assembly 440 may directly provide power for charging of individual instances of accessory batteries 300 as shown in FIG. 3. In some cases, however, the individual instances of the accessory batteries 300 may also receive power from the on-door battery 240, which could act as an intermediate power provision component between the individual instances of the accessory batteries 300 and the floor mounted inductive charging assembly 440.

Provision of the floor mounted inductive charging assembly 440 at the bottom of the sectional door 210 may be advantageous for charging with respect to doors that remain closed a majority of the time. Moreover, the floor mounted inductive charging assembly 440 may generally provide relatively easy alignment between the primary and secondary charge pads 442 and 444. In this regard, regardless of the number of open/close cycles of the sectional door 210, and regardless of traffic into, out of and around the enclosed space 200, the alignment may generally remain unchanged and thereby maximize power transfer efficiency. However, in the depicted example, the primary charge pad 442 may be a horizontal surface that may collect dust or debris. The buildup of dust or debris on the primary charge pad 442 could become a problem if routine cleaning is not performed. Thus, in some cases, it may be preferable to orient the primary charge pad 442 (and therefore also the secondary charge pad 444) vertically in order to minimize the potential for dust/debris buildup. Additionally, in cases where the on-door power distribution network 250 extends across panels, there must be a panel interface 460 to transition power from one panel to the next.

In some cases, the panel interface 460 may include flexible wire conduit or at least a protected space for the wire to bend as the sectional door 210 transitions between horizontal and vertical sections of the rails 114. However, in other cases, the panel interface 460 may simply be an electrical contact that is maintained through the transition or broken and remade after the transition. For this purpose, a portion of the hinges between the door panels may be dedicated to power transfer/coupling means in some cases. Alternative structures may be provided in some cases to avoid any need for the panel interface 460, as shown in FIG. 5.

Figure 5:
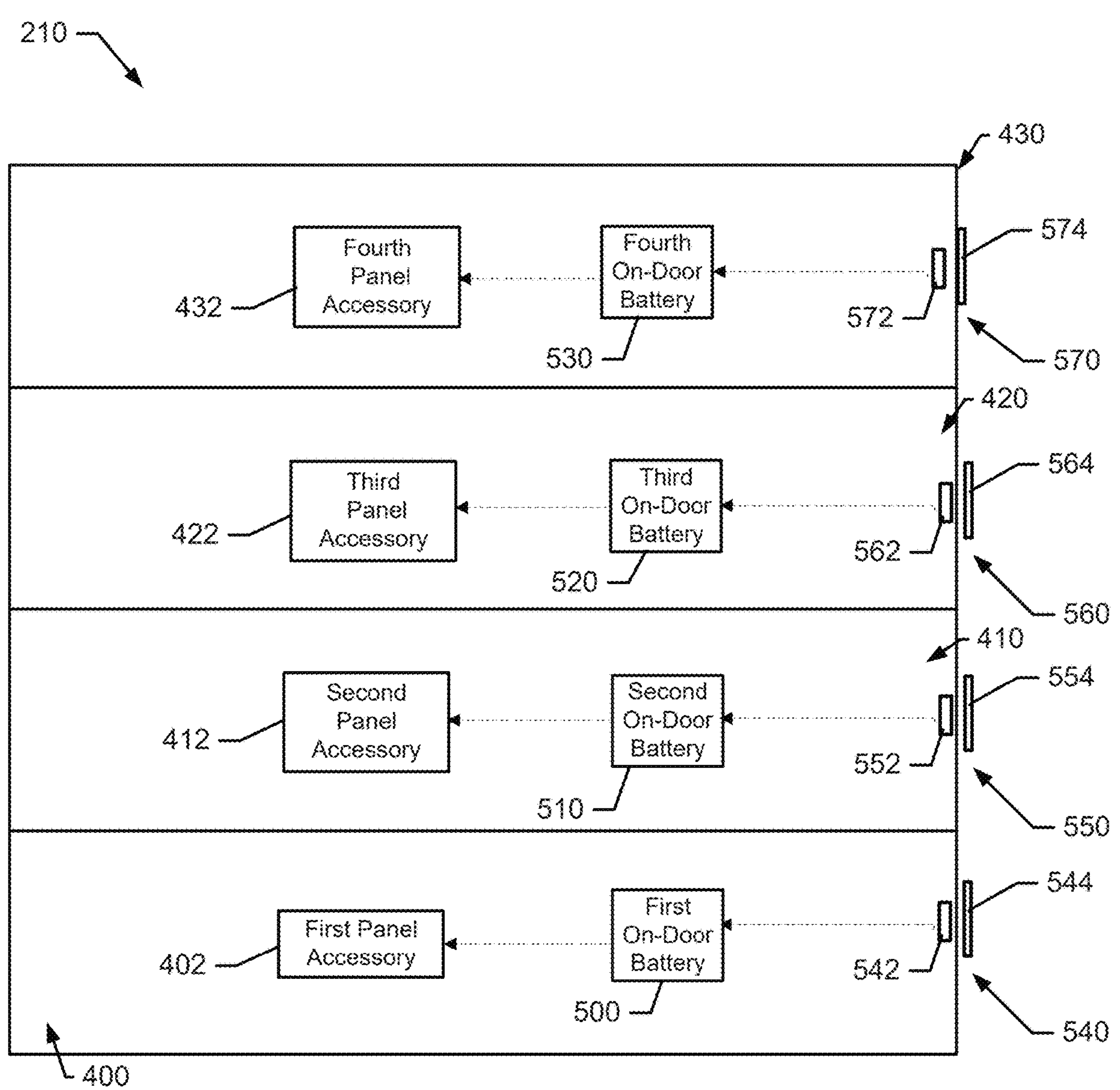
FIG. 5 illustrates a block diagram of an inductive charging system where each door panel includes its own pair of primary and secondary charge coils to power all accessories on the respective door panel according to an example embodiment.

In addition to showing a different architecture for powering the on-door accessories that avoids any need for the panel interface 460, FIG. 5 also shows vertical orientation of the inductive charging assembly. Turning to FIG. 5, the first door panel 400 includes an instance of a first on-door battery 500 that powers the first panel accessory 402 (along with any other accessories on the first door panel 400). Meanwhile, the second door panel 410 includes an instance of a second on-door battery 510 that powers the second panel accessory 412 (along with any other accessories on the second door panel 410), the third door panel 420 includes an instance of a third on-door battery 520 that powers the third panel accessory 422 (along with any other accessories on the third door panel 420), and the fourth door panel 430 includes an instance of a fourth on-door battery 530 that powers the third panel accessory 432 (along with any other accessories on the fourth door panel 430).

Meanwhile, each of the respective door panels may have its own respective vertically oriented inductive charging assembly. In this regard, for example, the first door panel 400 may have a first vertically oriented inductive charging assembly 540 for providing power to the first panel accessory 402 via the first on-door battery 500. The first vertically oriented inductive charging assembly 540 may include a first vertically oriented primary charge pad 542 that is mounted proximate to a side of the first door panel 400 and is aligned with a first vertically oriented secondary charge pad 544 when the sectional door 210 is in the open (or closed) position. The second vertically oriented inductive charging assembly 550 may include a second vertically oriented primary charge pad 552 that is mounted proximate to a side of the second door panel 410 and is aligned with a second vertically oriented secondary charge pad 554 when the sectional door 210 is in the open (or closed) position. The third vertically oriented inductive charging assembly 560 may include a third vertically oriented primary charge pad 562 that is mounted proximate to a side of the third door panel 420 and is aligned with a third vertically oriented secondary charge pad 564 when the sectional door 210 is in the open (or closed) position. The fourth vertically oriented inductive charging assembly 570 may include a fourth vertically oriented primary charge pad 572 that is mounted proximate to a side of the fourth door panel 430 and is aligned with a fourth vertically oriented secondary charge pad 574 when the sectional door 210 is in the open (or closed) position. Thus, for example, when the sectional door 210 is in the closed position (or alternatively in the open position), each one of the first, second, third and fourth vertically oriented inductive charging assemblies 540, 550, 560 and 570 may achieve alignment of primary and secondary coils to provide maximum efficiency of power transfer from off-door to on-door for the powering of on-door accessories.

Figure 6:
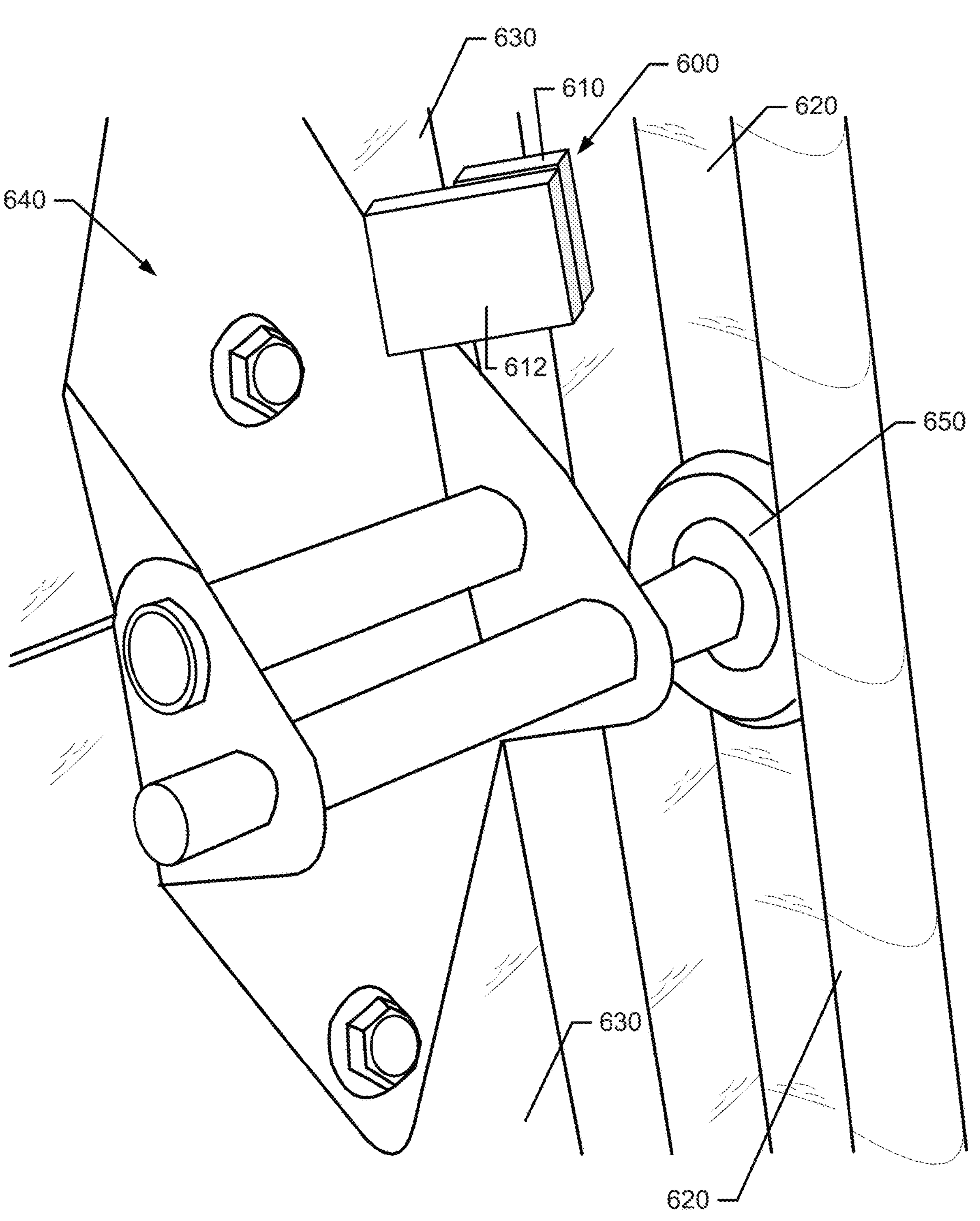
FIG. 6 illustrates a perspective view of a rail-mounted charging interface for a switchable viewing pane control system in accordance with an example embodiment.

In this regard, the first, second, third and fourth vertically oriented primary charge pads 542, 552, 562 and 572 may each include an instance of the primary charge coil 230 of FIGS. 2 and 3. The first, second, third and fourth vertically oriented secondary charge pads 544, 554, 564 and 574 may each include an instance of the secondary charge coil 232 and AC-DC converter 234 of FIGS. 2 and 3. By providing separate instances of inductive charging assemblies for each door panel, no wiring need extend across boundaries between panels of the sectional door 210. The location of the inductive charging assemblies shown in FIG. 5 may suggest to one of skill in the art an advantage to using the rails 114 of FIG. 1 as a mounting structure to which the first, second, third and fourth vertically oriented primary charge pads 542, 552, 562 and 572 may be mounted. The first, second, third and fourth vertically oriented secondary charge pads 544, 554, 564 and 574 may then be mounted at portions of the sectional door 210 that correspond to these rail-mounted locations. FIG. 6 illustrates one such example.

In this regard, for example, FIG. 6 illustrates a perspective view of a rail-mounted charging interface 600, which may be any one of the first, second, third and fourth vertically oriented inductive charging assemblies 540, 550, 560 and 570 of FIG. 5. In the example of FIG. 6, the rail-mounted charging interface 600 includes a primary charging pad 610 and secondary charging pad 612 similar to those discussed above in reference to FIG. 5 except that the primary charging pad 610 is attached to a rail 620 and the secondary charging pad 612 is attached to a section 630 (or panel) of the sectional door 210 and/or to a door hinge 640, which may further operably couple a roller 650 to the rail 620. The charging pad 610 and secondary charging pad 612 may be brought into proximity with each other when, for example, the sectional door 210 is in the closed position for charging as discussed above. However, rather than being on a high traffic area that may collect dust and debris, such as the floor-mounted charging inductive charging assembly 440, one or more instances of the rail-mounted charging interface 600 may be placed at any point along the rail 620 (including vertical portions thereof) to permit charging so that even open door charging may be possible. In some cases, as noted above, each section of the sectional door may have its own instance of the rail-mounted charging interface 600 to charge a corresponding local instance of the on-door battery for that section (e.g., the first, second, third, and fourth on-door batteries 500, 510, 520 and 530 of FIG. 5.

Figure 7:
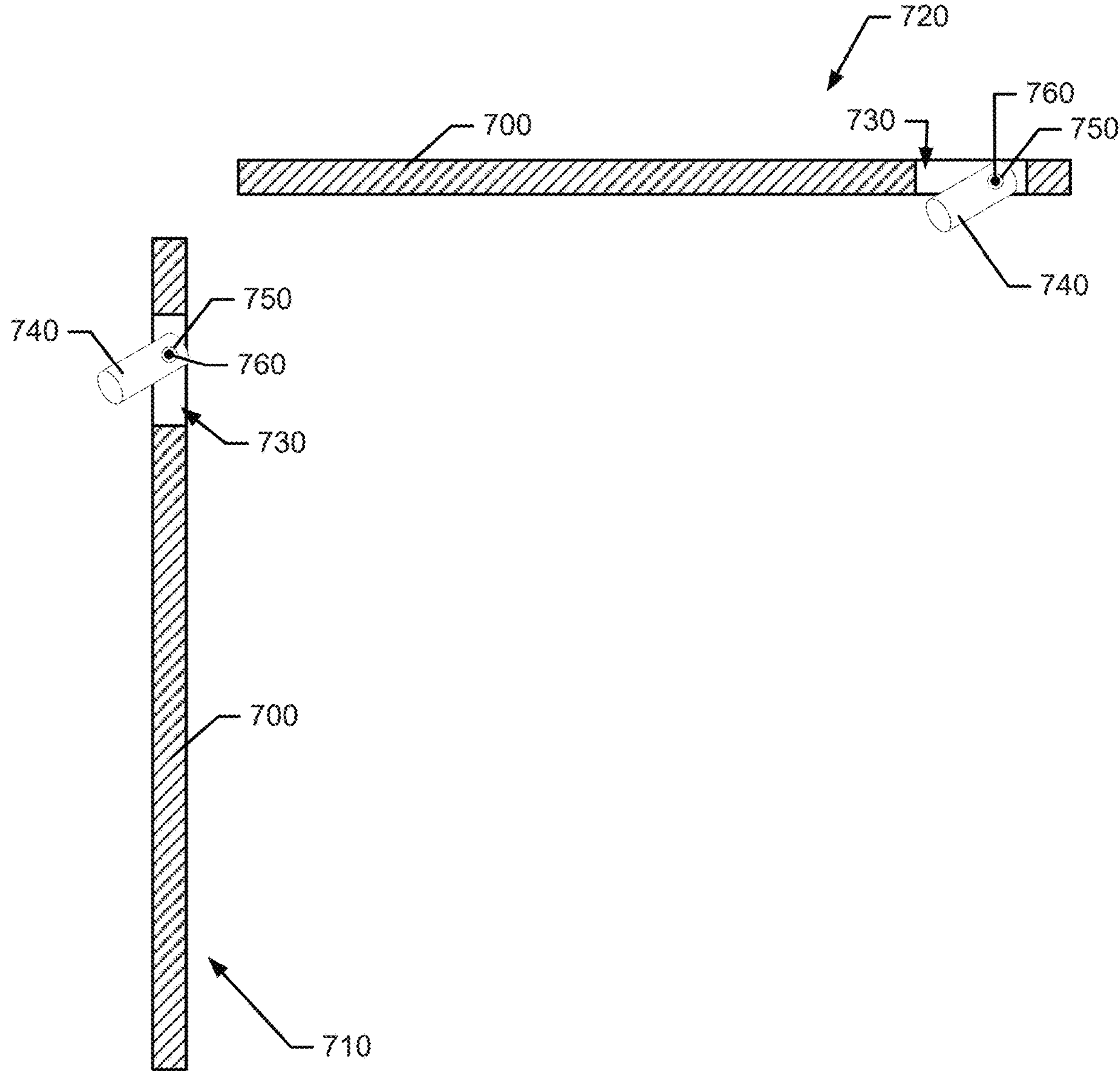
FIG. 7 illustrates a camera that can change its view based on door position according to an example embodiment.

The capability to reliably provide power to on-door accessories without complicated structures for wired connection to a moving barrier may unlock numerous additional capabilities with respect to the on-door accessories. In particular, accessories may be provided on-door that may be adaptive accessories that adapt or alternate status or capability based on door position or other conditions. FIG. 7 illustrates one such example. In this regard, FIG. 7 illustrates a cross sectional view of a sectional door 700 in a closed state 710 (on the left) and in an open state 720 (on the right). In the closed state 710, the sectional door 700 would be understood to be in vertical portions of the rails that the sectional door 700 rides in and is shown arranged vertically. In the open state 720, the sectional door 700 would be understood to be in horizontal portions of the rails that the sectional door 700 rides in and is shown arranged horizontally in FIG. 7.

The sectional door 700 includes a through hole 730 at a portion thereof. The through hole 730 passes from the inside of the sectional door 700 to the outside of the sectional door 700 and may or may not be enclosed with glass or transparent plastic. Inside the through hole 730, a camera assembly 740 is pivotably mounted to allow the camera assembly 740 to pivot based on the status of the sectional door 700 (e.g., based on whether the sectional door 700 is in the open state 720 or the closed state 710). In this regard, for example, a biasing assembly 750 may be mounted around a pivot member 760 or axis about which the camera assembly 740 pivots. The biasing assembly 750 may work against gravity and the weight of the camera assembly 740 to keep the camera assembly 740 generally pointed as a relatively consistent angle to the ground even though the camera assembly 740 is held in different orientations in the open state 720 versus the closed state 710. By providing this unique mounting, the camera assembly 740 can provide a view that looks in a direction outward relative to the enclosed space regardless of the status of the sectional door 700. If the camera assembly 740 was mounted on the opener and aimed to look outwardly, the camera assembly 740 would get a good view outside when the sectional door 700 was in the open state 720, but only see the back of the sectional door 700 and be effectively useless in the closed state 710. Meanwhile, if the camera assembly 740 was mounted on the sectional door 700 itself (a feat complicated in any case if avoidance of battery maintenance was desired), the camera assembly 740 would get a good view outside the sectional door 700 in the closed state 710, but would look only at the ceiling and generally be useless in the open state 720. Thus, by employing on-door power according to an example embodiment (e.g., where the camera assembly 740 can be powered or its battery powered via inductive charging), a unique mounting is enabled that allows the camera assembly 740 to shift its position by pivoting as the sectional door 700 changes position and state, and the camera assembly 740 gets a consistent view looking outside in both the closed state 710 and the open state 720.

Notably, instead of biasing the camera assembly 740, the on-board power may alternatively be used to power a small motor that may reposition the camera assembly 740 to provide the adaptive view described above.

Another example of an adaptive accessory may be a carbon monoxide sensor, which may be used along with a thermometer to provide different functionality to the opener 120 dependent upon the information gathered. In this regard, for example, if the carbon monoxide sensor detects high levels of carbon monoxide with normal temperatures, the opener 120 may be triggered to open (e.g., to relieve the harmful gas buildup in the enclosed space 200). However, if the carbon monoxide sensor detects high levels of carbon monoxide with high temperatures, then the gas reading may be driven by a fire inside the enclosed space 200, and opening the sectional door 210 may actually provide oxygen and fuel to the fire. Accordingly, dependent upon temperature (and sensor readings), different functionality may be achieved.

Accordingly, some example embodiments may provide a door operator system. The door operator system may include a sectional door, an opener operably coupled to the sectional door to move the sectional door via a roller assembly operably coupling the sectional door to a rail assembly to enable the sectional door to transition between an open state and a closed state via the roller assembly carrying the sectional door in the rail assembly, and a plurality of accessories associated with functions, features, monitoring or movement of the sectional door or components of the sectional door. The accessories may include at least one powered device having a rechargeable battery that is charged based on inductive charging via an inductive charging assembly.

The inductive charging assembly and/or a system including the same, or components thereof described above may be augmented or modified by altering individual features mentioned above or adding optional features. The augmentations or optional features may be added in any combination of the examples listed below. In this regard, for example, the accessories include one or more on-door accessories, and the inductive charging assembly may include a primary charge coil disposed proximate to the sectional door and a secondary charge coil disposed on the sectional door to provide direct current (DC) power to the rechargeable battery via an alternating current (AC) to DC converter. In an example embodiment, the rechargeable battery may power a plurality of the one or more on-door accessories. In some cases, the rechargeable battery may be one of a plurality of rechargeable batteries associated with respective different instances of the one or more on-door accessories, and each of the plurality of rechargeable batteries may be operably coupled to the secondary charge coil to be recharged via the secondary charge coil. In an example embodiment, the one or more on-door accessories may include a camera, privacy glass, a display screen, lighting, a sensor associated with the sectional door, or a lock. In some cases, the primary charge coil may be disposed to be oriented horizontally on the floor, and the secondary charge coil may be disposed in a panel of the sectional door that is proximate to the floor and aligned with the primary charge coil when the sectional door is in the closed state. In an example embodiment, the accessories may include one or more off-door accessories, and each instance of the one or more off-door accessories may include a primary charge coil disposed in an accessory mount that operably couples to a secondary charge coil of a respective one of the each instance of the one or more off-door accessories. In some cases, mains power may supply power to a plurality of off-door accessories and corresponding accessory mounts. In an example embodiment, the sectional door may include at least a first door panel having a first panel accessory and a second door panel including a second panel accessory. In such an example, both the first and second panel accessories may be powered via the rechargeable battery that is operably coupled to the first and second panel accessories via an on-door power distribution network, and the rechargeable battery may be located on the first panel. In some cases, the on-door power distribution network may include a panel interface between at least the first and second door panels to provide electrical connectivity across the first and second door panels through a transition between the open and closed states of the sectional door. In an example embodiment, the sectional door may include at least a first door panel having a first panel accessory and a second door panel including a second panel accessory, the inductive charging assembly may include a first primary charge coil disposed off-door proximate to a first secondary charge coil disposed on the first door panel, and the inductive charging assembly may include a second primary charge coil disposed off-door proximate to a second secondary charge coil disposed on the second door panel In some cases, the first and second primary charge coils may each be operably coupled to a rail of the rail assembly. In an example embodiment, at least one of the accessories may be an adaptive accessory that has an alternate status or capability based on door position of the sectional door. In some cases, the adaptive accessory may include a camera that pivots as the sectional door change between the open and closed states to provide a view outside the sectional door in both the open and closed states.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A door operator system comprising:

a sectional door;

an opener operably coupled to the sectional door to move the sectional door via a roller assembly operably coupling the sectional door to a rail assembly to enable the sectional door to transition between an open state and a closed state via the roller assembly carrying the sectional door in the rail assembly; and a plurality of accessories associated with the sectional door or components of the sectional door, wherein the accessories include at least one powered device having a rechargeable battery that is charged based on inductive charging via an inductive charging assembly, wherein the sectional door includes at least a first door panel having a first panel accessory and a second door panel including a second panel accessory, wherein both the first and second panel accessories are powered via the rechargeable battery that is operably coupled to the first and second panel accessories via an on-door power distribution network, and wherein the rechargeable battery is located on the first panel.

2. The system of claim 1, wherein the accessories include one or more on-door accessories, and wherein the inductive charging assembly comprises a primary charge coil disposed proximate to the sectional door and a secondary charge coil disposed on the sectional door to provide direct current (DC) power to the rechargeable battery via an alternating current (AC) to DC converter.

3. The system of claim 2, wherein the rechargeable battery powers a plurality of the one or more on-door accessories.

4. The system of claim 2, wherein the one or more on-door accessories include a camera, privacy glass, a display screen, lighting, a sensor associated with the sectional door, or a lock.

5. The system of claim 2, wherein the primary charge coil is disposed to be oriented horizontally on the floor, and wherein the secondary charge coil is disposed in a panel of the sectional door that is proximate to the floor and aligned with the primary charge coil when the sectional door is in the closed state.

6. The system of claim 1, wherein the accessories include one or more off-door accessories, and wherein each instance of the one or more off-door accessories includes a primary charge coil disposed in an accessory mount that operably couples to a secondary charge coil of a respective one of the each instance of the one or more off-door accessories.

7. The system of claim 5, wherein mains power supplies power to a plurality of off-door accessories and corresponding accessory mounts.

8. The system of claim 1, wherein the on-door power distribution network comprises a panel interface between at least the first and second door panels to provide electrical connectivity across the first and second door panels through a transition between the open and closed states of the sectional door.

9. The system of claim 1, wherein the sectional door includes at least a first door panel having a first panel accessory and a second door panel including a second panel accessory, wherein the inductive charging assembly comprises a first primary charge coil disposed off-door proximate to a first secondary charge coil disposed on the first door panel, and wherein the inductive charging assembly comprises a second primary charge coil disposed off-door proximate to a second secondary charge coil disposed on the second door panel.

10. The system of claim 9, wherein the first and second primary charge coils are each operably coupled to a rail of the rail assembly.

11. The system of claim 1, wherein at least one of the accessories is an adaptive accessory that has an alternate status or capability based on door position of the sectional door.

12. The system of claim 11, wherein the adaptive accessory comprises a camera that pivots as the sectional door change between the open and closed states to provide a view outside the sectional door in both the open and closed states.

13. A door operator system comprising:

a sectional door;

an opener operably coupled to the sectional door to move the sectional door via a roller assembly operably coupling the sectional door to a rail assembly to enable the sectional door to transition between an open state and a closed state via the roller assembly carrying the sectional door in the rail assembly; and a plurality of accessories associated with the sectional door or components of the sectional door, wherein the accessories include at least one powered device having a rechargeable battery that is charged based on inductive charging via an inductive charging assembly, wherein the accessories include one or more on-door accessories, and wherein the inductive charging assembly comprises a primary charge coil disposed proximate to the sectional door and a secondary charge coil disposed on the sectional door to provide direct current (DC) power to the rechargeable battery via an alternating current (AC) to DC converter, wherein the rechargeable battery is one of a plurality of rechargeable batteries associated with respective different instances of the one or more on-door accessories, and wherein each of the plurality of rechargeable batteries is operably coupled to the secondary charge coil to be recharged via the secondary charge coil.

14. An on-door power distribution network for powering accessories of a door operator system without wires extending on-door from off-door, the door operator system comprising a sectional door and an opener operably coupled to the sectional door to move the sectional door, the on-door power distribution network comprising:

a secondary charge coil disposed at a portion of the sectional door that is proximate to a primary charge coil disposed adjacent to the sectional door when the sectional door is in a closed position;

an alternating current to direct current (AC-DC) converter to convert AC output from the secondary charge coil to DC;

a plurality of accessories associated with the sectional door or components of the sectional door; and a rechargeable battery that is charged via the DC converted at the AC-DC converter, the rechargeable battery being associated with one or more of the accessories, wherein the sectional door includes at least a first door panel having a first panel accessory and a second door panel including a second panel accessory, wherein both the first and second panel accessories are powered via the rechargeable battery that is operably coupled to the first and second panel accessories via an on-door power distribution network, and wherein the rechargeable battery is located on the first panel.

15. The on-door power distribution network of claim 14, wherein the rechargeable battery powers all of the accessories that are operably coupled to the secondary charge coil.

16. The on-door power distribution network of claim 14, wherein the rechargeable battery is one of a plurality of rechargeable batteries that each power respective ones of the accessories that are operably coupled to the secondary charge coil.

17. The on-door power distribution network of claim 14, wherein the accessories are distributed across different door panels of the sectional door, and wherein the on-door power distribution network comprises a panel interface between each of the different door panels to provide electrical connectivity across the different door panels through a transition between open and closed states of the sectional door.

18. The on-door power distribution network of claim 14, wherein the accessories are distributed across different door panels of the sectional door, and wherein each of the different door panels has a corresponding instance of the secondary charge coil to power all accessories located on respective ones of the each of the different door panels.

* * * * *